(12) United States Patent
Zhao

(10) Patent No.: US 11,904,293 B2
(45) Date of Patent: Feb. 20, 2024

(54) FAR-INFRARED NEGATIVE ION CARBON COMPOSITE PLATE AND MANUFACTURING PROCESS THEREOF

(71) Applicant: Xingan Zhao, Zhejiang (CN)

(72) Inventor: Xingan Zhao, Zhejiang (CN)

( * ) Notice: Subject to any disclaimer, the term of this patent is extended or adjusted under 35 U.S.C. 154(b) by 821 days.

(21) Appl. No.: 16/981,296

(22) PCT Filed: Mar. 15, 2019

(86) PCT No.: PCT/CN2019/078204
§ 371 (c)(1),
(2) Date: Sep. 16, 2020

(87) PCT Pub. No.: WO2019/174624
PCT Pub. Date: Sep. 19, 2019

(65) Prior Publication Data
US 2021/0008520 A1  Jan. 14, 2021

(30) Foreign Application Priority Data

Mar. 16, 2018 (CN) .......................... 201810220066.X

(51) Int. Cl.
*B01J 20/20* (2006.01)
*B01J 20/10* (2006.01)
*B01J 20/16* (2006.01)
*B01J 20/30* (2006.01)

(52) U.S. Cl.
CPC .............. *B01J 20/20* (2013.01); *B01J 20/10* (2013.01); *B01J 20/16* (2013.01); *B01J 20/3007* (2013.01); *B01J 20/3064* (2013.01); *B01J 20/3085* (2013.01)

(58) Field of Classification Search
CPC ... B01J 20/20; B01J 20/10; B01J 20/16; B01J 20/3007; B01J 20/3064; B01J 20/3085; C04B 2111/00612; C04B 26/02; C04B 14/022; C04B 14/047; C04B 14/20; C04B 2111/00017; C04B 2111/00025; C04B 2103/0097; Y02W 30/91; C08J 9/0066; C08J 9/04; C08J 2300/00; C08K 3/04; C08K 3/34; C08K 7/26
See application file for complete search history.

(56) References Cited

U.S. PATENT DOCUMENTS

2018/0186647 A1* 7/2018 Zhao .................... C01B 32/382

FOREIGN PATENT DOCUMENTS

| CN | 103924756 | 7/2014 |
|---|---|---|
| CN | 104961384 | 10/2015 |
| CN | 106117800 | 11/2016 |
| CN | 106432977 | 2/2017 |
| CN | 106566087 | 4/2017 |
| CN | 108409196 | 8/2018 |
| CN | 108676275 | 10/2018 |
| JP | 2004010433 | 1/2004 |

OTHER PUBLICATIONS

"International Search Report (Form PCT/ISA/210) of PCT/CN2019/078204," dated Jun. 12, 2019, pp. 1-6.

* cited by examiner

*Primary Examiner* — Andrew J. Oyer
(74) *Attorney, Agent, or Firm* — JCIPRNET

(57) ABSTRACT

Disclosed is the object of the present invention to provide a far-infrared negative ion carbon composite plate and a manufacturing process thereof. The composite plate comprises the following components (by weight percentage): 10-6000 mesh mica powder 0.5%-95%; 10-200 mesh carbon powder 5%-91%; resin 15%-90%; dispersant 0.1%-10%; zeolite powder 1%-50%; foaming agent 0.1%-20%; and regulator 0.1-20%. The physical properties such as hardness, density, bending strength, and high and low temperature resistance of various plates of the present invention can be adjusted by means of the formulation and temperature of the material; the plates can resist 80% or more of the pressure and wear resistance of ordinary plates, and have a certain cushioning performance. The plates have no bad and harmful substances; far-infrared emissivity of as high as 80% or more, and the amount of negative oxygen ions released of 1000/cc or more.

7 Claims, No Drawings

FAR-INFRARED NEGATIVE ION CARBON COMPOSITE PLATE AND MANUFACTURING PROCESS THEREOF

CROSS-REFERENCE TO RELATED APPLICATION

This application is a 371 of international application of PCT application Ser. No. PCT/CN2019/078204, filed on Mar. 15, 2019, which claims the priority benefit of China application no. 201810220066.X, filed on Mar. 16, 2018. The entirety of each of the above mentioned patent applications is hereby incorporated by reference herein and made a part of this specification.

FIELD OF TECHNOLOGY

The invention relates to the technical field of plate manufacturing, in particular to a far-infrared negative ion carbon composite plate and a manufacturing process thereof.

BACKGROUND

In recent years, various home improvement and furniture markets have launched plates and supporting products of different types and materials with the concept of health and environmental protection, consumers are dazzled and do not know how to choose. Many businesses, in order to achieve good results, fast installation, and low cost to achieve improper profitability, especially the so-called bamboo fiberboard products on the market are fiercely competing with each other, do not hesitate to add harmful substances or use recycled cheap PVC materials as adhesives and other materials. The material has unstable performance and short service life, which causes consumers to suffer different degrees of economic loss and health hazards. The indoor and outdoor decoration material plates on the market have the problems of high pollution which is not good for health and unstable product performance, and the cost is not low. Generally, the resin ratio of the products used is relatively high.

SUMMARY

The object of the present invention is to provide a far-infrared negative ion carbon composite plate and a manufacturing process thereof, which solves the problems of high cost, unstable product performance, and large pollution that is not good for health of traditional various plates and decoration materials, and also releases a large amount of far-infrared and negative ions needed by the human body and adjusts the humidity, which can be self-connected for packaging, tableware and other materials.

In order to solve the above technical problems, the present invention provides a far-infrared negative ion carbon composite plate, comprising the following components (by weight percentage): 10-6000 mesh mica powder 0.5%-95%; 10-200 mesh carbon powder 5%-91%; resin 15%-90%; dispersant 0.1%-10%; zeolite powder 1%-50%; foaming agent 0.1%-20% and regulator 0.1%-20%.

The present invention also provides a process for manufacturing a far-infrared negative ion carbon composite plate, comprising the following steps: step 1: mixing and colliding the high-temperature carbon and mica powder with a weight percentage of 1-3:1 on a 30-300° C., 5000 r/min high-speed mixer to form a master batch; step 2: mixing the other raw materials in proportion and putting them into an agitator to mix well; step 3: heating at 10-300° C. for 2-20 minutes; step 4: adding the mixed master batch (based on the mica powder); step 5: then high-speed stirring and heating; step 6: extruding according to a mold, cooling and cutting.

Compared with the prior art, the beneficial effects of the present invention are: the present invention is a new type of far-infrared negative ion plate and decoration material and a manufacturing process thereof. The physical properties of various plates of the present invention: the formulation and temperature of the material can be used to adjust hardness, density, bending strength, high and low temperature resistance; the plates can resist 60% or more of the pressure and wear resistance of ordinary plates, and have a certain cushioning performance. Chemical properties: no bad and harmful substances; the high-temperature carbon, carbonization time, and ratio of various materials are used to adjust far-infrared, negative ions, formaldehyde reduction and other indicators. High-quality mica powder has a far-infrared emissivity of 95% or more, and the amount of negative oxygen ions released of 1000/cc or more. Negative ions with small particle size can also effectively eliminate home decoration pollution, and decompose formaldehyde, benzene and other carcinogens, wherein the decomposition products are non-toxic and tasteless carbon dioxide and water. The combination of carbon and zeolite powder accelerates the adsorption and reduction of harmful substances such as sulfides, nitrides, formaldehyde, benzene, phenol, etc. (the formaldehyde reduction of 3 kilograms of plates in a cubic sealed cabin for 24 hours is 65% or more), and has a strong function of moisture absorption, moisture prevention, moisture release, and odor removal, with strong health care functions. The product made by adding 10% or more of mica powder, high-temperature carbon and zeolite powder to the material of the present invention, uses mica to generate heat in the "Brownian motion" of the carbon molecules of high-temperature carbon, and to continuously produce about 90% of the far-infrared rays to radiate heat at the same time, resulting in the permanent release of far-infrared and negative ions which are important to human health. The various renovated houses are equivalent to living in Bama, the longest-lived place in the world or the primeval forest.

DESCRIPTION OF THE EMBODIMENTS

The specific processing technology of the present invention is further described in detail in combination with the process flow:

EXAMPLE 1

A far-infrared negative ion carbon composite plate comprises the following components (by weight percentage): 80 mesh bamboo carbon powder 20%; resin 20%; 100 mesh mica powder 1%; flame retardant 8%; dispersant 3%; 200 mesh zeolite powder 20%; other vegetable carbon 24%; foaming agent 1%; and regulator 3%.

A process for manufacturing the far-infrared negative ion carbon plate comprises the following steps: step 1: mixing and colliding the high-temperature carbon powder and mica powder with a weight percentage of 2:1 on a 30-300° C., 5000 r/min high-speed mixer to form a master batch; step 2: mixing the other raw materials in proportion and putting them into an agitator to mix well; step 3: heating at 80° C. for 3 minutes; step 4: adding the mixed master batch (based on the mica powder); step 5: then high-speed stirring and heating; step 6: extruding according to a mold, cooling and cutting. Zeolite powder has the functions of increasing adsorption and rapid degradation and eliminating toxic heavy metal ions. Mica generates heat in the "Brownian motion" of the carbon molecules of high-temperature carbon, and produces about 85% of the far-infrared rays to radiate heat at the same time, resulting in the permanent release of far-infrared and negative ions which are important to human health. The obtained plate does not contain any substances that are toxic to the human body. According to the test, the hardness, bending strength, and stability of the plate are far beyond that of the wood plate and other recycled plates currently on the market. The fire protection rating is B, and it can be used for decoration in public places.

EXAMPLE 2

A far-infrared negative ion carbon composite plate comprises the following components (by weight percentage): 200 mesh bamboo carbon powder 60%; resin 6%; 1000 mesh mica powder 5%; flame retardant 0.5%; dispersant 0.5%; zeolite powder 10%; other vegetable carbon 10%; foaming agent 2%; and regulator 6%.

A process for manufacturing the far-infrared negative ion carbon comprises the following steps: step 1: mixing and colliding a small part of the high-temperature carbon powder and mica powder with a weight percentage of 1:1 on a 30-300 ° C., 5000 r/min high-speed mixer to form a master batch; step 2: mixing the other raw materials in proportion and putting them into an agitator to mix well; step 3: heating at 100° C. for 3 minutes; step 4: adding the mixed master batch (based on the mica powder); step 5: then high-speed stirring and heating; step 6: extruding according to a mold, cooling and cutting. Zeolite powder has the functions of increasing adsorption and rapid degradation and eliminating toxic heavy metal ions. Mica generates heat in the "Brownian motion" of the carbon molecules of high-temperature carbon, and produces about 85% of the far-infrared rays to radiate heat at the same time, resulting in the permanent release of far-infrared and negative ions which are important to human health. The plate and decoration materials made of the above materials do not contain any substances that are toxic to the human body. According to the test, the hardness, bending strength, and stability of the plate are far beyond that of the other plates and recycled plates currently on the market. The fire protection rating is BE, and amount of negative ions released is 3850/cc. High carbon content is used for furniture and home decoration, and can also adjust the humidity. The large amount of negative ions released can also be used to make various foods and fruit packaging to extend the shelf life of various foods, and to make tableware and other products.

The far-infrared effect of mica and high-temperature carbon can permanently release negative ions. Negative ions can not only promote the synthesis and storage of vitamins in the human body, but also strengthen and activate the physiological activities of the human body, and have a very important influence on the life activities of the human body and other organisms.

EXAMPLE 3

A far-infrared negative ion carbon composite plate comprises the following components (by weight percentage): 80 mesh carbon powder 10%; resin 10%; 80 mesh mica powder 73.7%; flame retardant 1%; dispersant 1%; 100 mesh zeolite powder 3%; foaming agent 0.3%; and regulator 1%.

A process for manufacturing the far-infrared negative ion carbon plate comprises the following steps: step 1: mixing and colliding the high-temperature carbon powder and mica powder with a weight percentage of 2:1 on a 30-300° C., 5000 r/min high-speed mixer to form a master batch; step 2: mixing the other raw materials in proportion and putting them into an agitator to mix well; step 3: heating at 80° C. for 3 minutes; step 4: adding the mixed master batch (based on the mica powder); step 5: then high-speed stirring and heating; step 6: extruding according to a mold, cooling and cutting. Zeolite powder has the functions of increasing adsorption and rapid degradation and eliminating toxic heavy metal ions. Mica generates heat in the "Brownian motion" of the carbon molecules of high-temperature carbon, and produces about 85% of the far-infrared rays to radiate heat at the same time, resulting in the permanent release of far-infrared and negative ions which are important to human health. The obtained plate does not contain any substances that are toxic to the human body. According to the test, the hardness, bending strength, and stability of the plate are far beyond that of the wood plate and other recycled plates currently on the market. The amount of negative ions released is 5000/cc, and the fire protection rating is AB. It can be used for the decoration of public places such as entertainment and shopping malls with many people.

EXAMPLE 4

A far-infrared negative ion carbon composite plate comprises the following components (by weight percentage): 50 mesh carbon powder 80%; resin 3%; mica powder 3%; flame retardant 10%; dispersant 0.5%; zeolite powder 3%; foaming agent 0.1% and regulator 0.4%.

A process for manufacturing the far-infrared negative ion carbon plate comprises the following steps: step 1: mixing and colliding the high-temperature carbon powder and mica powder with a weight percentage of 3:1 on a 30-300° C., 5000 r/min high-speed mixer to form a master batch; step 2: mixing the other raw materials in proportion and putting them into an agitator to mix well; step 3: heating at 50° C. for 3 minutes; step 4: adding the mixed master batch (based on the mica powder); step 5: then high-speed stirring and heating; step 6: extruding according to a mold, cooling and cutting. Zeolite powder has the functions of increasing adsorption and rapid degradation and eliminating toxic heavy metal ions. Mica generates heat in the "Brownian motion" of the carbon molecules of high-temperature carbon, and produces about 85% of the far-infrared rays to radiate heat at the same time, resulting in the permanent release of far-infrared and negative ions which are important to human health. The obtained plate does not contain any substances that are toxic to the human body. According to the test, the hardness, bending strength, and stability of the plate are far beyond that of the other plates and recycled plates currently on the market. The high-temperature carbon content is high, and it is resistant to ultraviolet rays, rain, high and low temperature differences, and is suitable for outdoor use.

EXAMPLE 5

A far-infrared negative ion carbon composite plate comprises the following components (by weight percentage): 10 mesh carbon powder 1%; resin 80%; 6000 mesh mica powder 5%; flame retardant 1%; dispersant 3%; zeolite powder 1%; foaming agent 3%; and regulator 6%.

The process is the same as in Example 1.

EXAMPLE 6

A far-infrared negative ion carbon composite plate comprises the following components (by weight percentage): 250 mesh carbon powder 10%; 1000 mesh mica powder 80%; flame retardant 3%; dispersant 5%; zeolite powder 1%; foaming agent 1%; and regulator 1%.

The process is the same as in Example 2.

EXAMPLE 7

A far-infrared negative ion carbon composite plate comprises the following components (by weight percentage): 100 mesh carbon powder 5%; resin 30%; 1000 mesh mica powder 30%; flame retardant 1%; dispersant 10%; zeolite powder 5%; foaming agent 10%; and regulator 10%.

The process is the same as in Example 3.

The test results of the product of the present invention: the specific surface area is 280 m$^2$/g; the pore area of the plate is 256 m$^2$/g; the far-infrared emissivity is 94.6%; the amount of negative ions released is 1500 /cc; the methylene blue adsorption value is 210 mg/g; the adsorption value of ethylene gas is 5.45 ml/g, and the pH value is 5.3.

The present invention is a new type of far-infrared negative ion plate and decoration material and a manufacturing process thereof. The physical properties of various plates of the present invention: the formulation and temperature of the material can be used to adjust hardness, density, bending strength, high and low temperature resistance; the plates can resist 60% or more of the pressure and wear resistance of ordinary plates, and have a certain cushioning performance. Chemical properties: no bad and harmful substances; the high-temperature carbon, carbonization time, and ratio of various materials are used to adjust far-infrared, negative ions, formaldehyde reduction and other indicators. High-quality mica powder has a far-infrared emissivity of 95% or more, and the amount of negative oxygen ions released of 30000/cc or more. Negative ions with small particle size can also effectively eliminate home decoration pollution, and decompose formaldehyde, benzene and other carcinogens, wherein the decomposition products are non-toxic and tasteless carbon dioxide and water. The combination of carbon and zeolite powder accelerates the adsorption and reduction of harmful substances such as sulfides, nitrides, formaldehyde, benzene, phenol, etc. (the formaldehyde reduction of 3 kilograms of plates in a cubic sealed cabin for 24 hours is 65% or more), and has a strong function of moisture absorption, moisture prevention, moisture release, and odor removal, with strong health care functions. The product made by adding 10% or more of mica powder, high-temperature carbon and zeolite powder to the material of the present invention, uses mica to generate heat in the "Brownian motion" of the carbon molecules of high-temperature carbon, and to continuously produce about 90% of the far-infrared rays to radiate heat at the same time, resulting in the permanent release of far-infrared and negative ions which are important to human health. The various renovated houses are equivalent to living in Bama, the longest-lived place in the world or the primeval forest.

When the carbon powder is 220 mesh bamboo carbon powder, the formaldehyde adsorption capacity corresponding to the same size material is the best, reaching 72 mg/g.

Preferably, the carbon powder is an activated carbon powder obtained by mixing a bamboo carbon-based activated carbon and KOH in a weight ratio of 1:2, and activating at 900° C. in an inert gas atmosphere for 2 hours, wherein the bamboo carbon-based activated carbon is obtained by heating bamboo carbon powder at 700-850° C. for 4-6 hours and activating by KOH. Its capacitance specific capacity for constant current charging and discharging at a current density of 0.06 mA/g can reach 250 F/g, showing good high current charging and discharging performance.

For those skilled in the art, it is obvious that the present invention is not limited to the details of the above exemplary embodiments, and the present invention can be implemented in other specific forms without departing from the spirit or basic characteristics of the present invention. Therefore, from any point of view, the embodiments should be regarded as exemplary and non-restrictive. The scope of the present invention is defined by the appended claims rather than the above description, and therefore it is intended that all changes falling within the meaning and scope of equivalent elements of the claims are included in the present invention.

In addition, it should be understood that although this specification is described in accordance with the embodiments, not each embodiment only includes an independent technical solution. This narrative manner in the specification is only for clarity, and those skilled in the art should regard the specification as a whole, and the technical solutions in the embodiments can also be appropriately combined to form other embodiments that can be understood by those skilled in the art.

What is claimed is:

1. A far-infrared negative ion carbon composite plate, comprising following components by weight percentage:
    10-6000 mesh mica powder 0.5%-95%; 10-250 mesh carbon powder 0.5%-95%;
    resin 15%-90%; dispersant 0.1%-10%; zeolite powder 1%-50%; foaming agent 0.1% -20%; and regulator 0.1-20%.

2. The far-infrared negative ion carbon composite plate according to claim 1, comprising following components by weight percentage: 50 mesh carbon powder 75%; resin 15%; mica powder 1%; flame retardant 5%; dispersant 0.5%; zeolite powder 3%; foaming agent 0.1%; and regulator 0.4%.

3. The far-infrared negative ion carbon composite plate according to claim 1, comprising following components by weight percentage: 10 mesh carbon powder 1%; resin 80%; 6000 mesh mica powder 5%; flame retardant 1%; dispersant 3%; zeolite powder 1%; foaming agent 3%; and regulator 6%.

4. The far-infrared negative ion carbon composite plate according to claim 1, wherein the carbon powder is 220 mesh bamboo carbon powder.

5. The far-infrared negative ion carbon composite plate according to claim 4, wherein the bamboo carbon powder further contains KOH, and a weight of KOH is twice a weight of the bamboo carbon powder.

6. A process for manufacturing the far-infrared negative ion carbon composite plate according to claim 1, comprising following steps: step 1: mixing and colliding a part of high-temperature carbon and mica powder with amount of 2:1 of carbon to mica on a 30-300° C., 5000 r/min high-speed mixer to form a master batch; step 2: mixing other raw materials in proportion and putting the other raw materials into an agitator to mix well; step 3: heating at 80° C. for 3 minutes; step 4: adding the mixed master batch; step 5: high-speed stirring and heating; and step 6: extruding according to a mold, cooling and cutting.

7. The process for manufacturing the far-infrared negative ion carbon composite plate according to claim 6, wherein the carbon powder in the other raw materials is an activated carbon powder obtained by mixing a bamboo carbon-based activated carbon and KOH in a weight ratio of 1:2, and activating at 900° C. in an inert gas atmosphere for 2 hours, wherein the bamboo carbon-based activated carbon is obtained by heating bamboo carbon powder at 700-850° C. for 4-6 hours and activating by KOH.

* * * * *